ns Patent Office 3,702,728
Patented Nov. 14, 1972

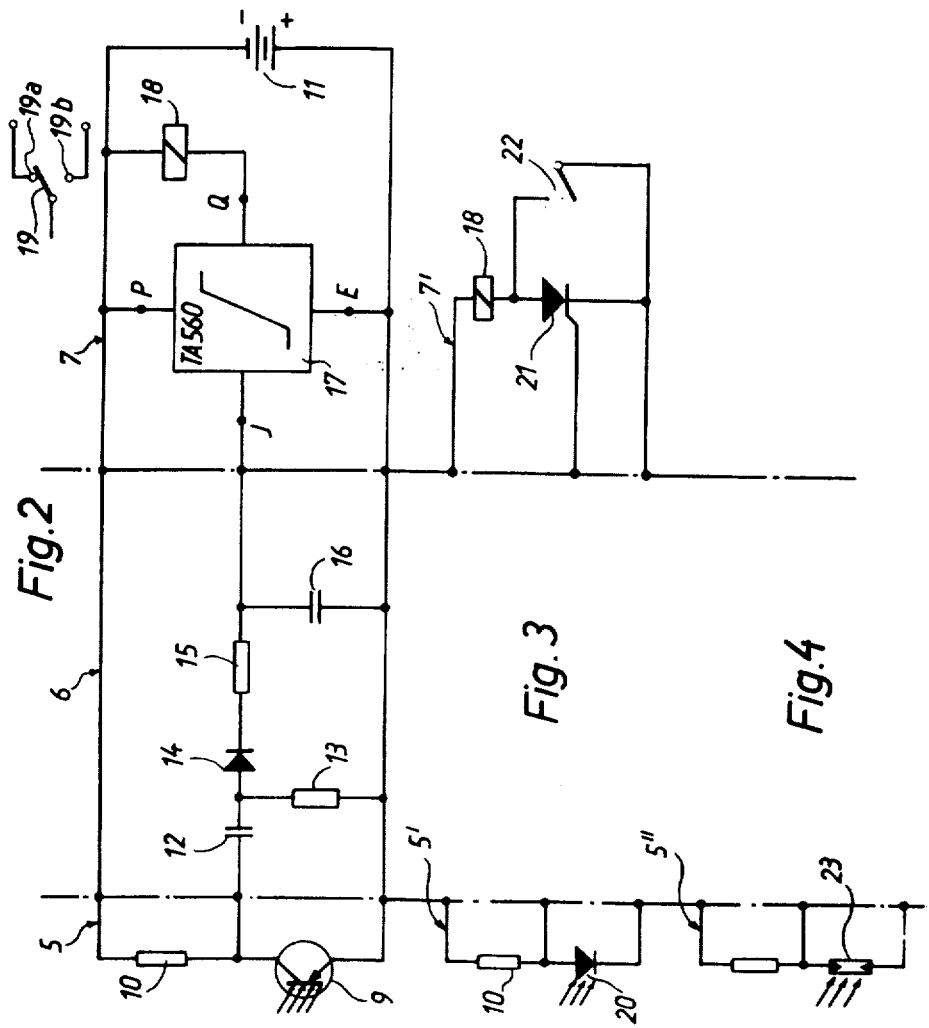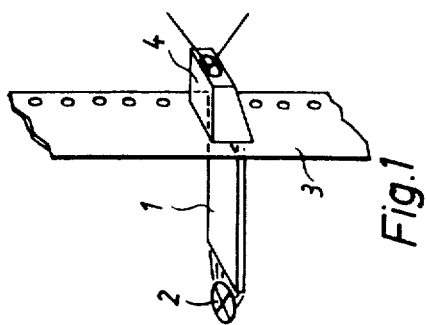

3,702,728
AUTOMATIC SWITCHING ARRANGEMENT FOR MOTION PICTURE FILM PROJECTORS

Alfred Winkler and Eduard Wagensonner, Munich, Germany, assignors to Agfa-Gevaert Aktiengesellschaft, Leverkusen, Germany
Filed Dec. 18, 1970, Ser. No. 99,584
Claims priority, application Germany, Dec. 23, 1969,
P 19 64 728.0
Int. Cl. G03b 21/50
U.S. Cl. 352—92                                14 Claims

ABSTRACT OF THE DISCLOSURE

The varying intensity of the light passing through the exposed portion of a film causes a constantly changing voltage in a circuit having a photosensitive element, such as a phototransistor. This varying voltage operates a threshold switch, such as a thyristor, to switch the projector automatically from high threading speed to projection speed.

BACKGROUND OF THE INVENTION

The invention relates to a motion picture film projector for use with film having a leader and/or a trailer, the leader and/or trailer having a uniform light transmissivity and the exposed portion of the film having a non-uniform light transmissivity. The light transmissivity of the leader and/or trailer can vary from complete opacity to complete transparency.

In the prior art there are devices for switching a motion picture film projector from one operating state to another, as is the case, for example, when the leader is to be threaded, or run through the projector, in the shortest possible time. The shortest time results when the leader is threaded at a speed appreciably greater than the projection speed and the projector is switched to the projection speed exactly when the first exposed frame is positioned in the gate of the projector. The film can be auomatically rewound by the operation of a switch at the end of the projection.

In the prior art there are switching devices that are operated automatically by the film pull at the moment that the beginning of the film is wound up on the take-up reel. With these known devices, the leader of each film must have a predetermined length exactly equal to the path length from the film gate to the hub of the take-up reel, the film pull taking effect exactly when the first frame is in the film gate. These devices solve only part of the problem. The length of the leader varies from film to film. Consequently, the aforesaid path length must be adjusted to the shortest of the leaders. With longer leaders, the projector is prematurely switched to the slower projection speed, a fact that undesirably and greatly increases the threading time, since a part of the leader is moved through the film gate at projection speed.

SUMMARY OF THE INVENTION

An object of the invention is an arrangement for automatically switching a projector from one state to another state independently of the length of the leader and/or the trailer.

In accordance with the invention this switching is done in dependence on the local changes in transmissivity of the exposed portion of the film.

The invention consists essentially of switch means having first and second states and operative with a motion picture film having at least one end a uniformly light transmissive strip, the switch means including responsive means responsive to the local changes in light transmissivity of the non-uniformly light transmissive exposed portion of the film, as the film is drawn through the projector, to switch operation of a projector from a first state to a second state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 shows one possible positioning of the light sensitive receiver with respect to the film and the light source;

FIG. 2 shows a first embodiment of the circuit; and

FIGS. 3 and 4 show two additional embodiments of the circuit.

DESCRIPTION OF THE PREFERRED EMBODIMENTS

A light conductive rod 1 conducts a beam of light from a lamp 2, which is preferably the projection lamp of the projector, onto the film 3. A light-sensitive receiver 4 is positioned behind the film so as to receive the beam of light. In a manner not shown, the light-sensitive receiver 4 is mounted in the film advance in front of the gate of the projector. The gate, not shown, is located between the projection lamp and the optics of the projector. The exact manner of mounting the receiver 4 can take any desired and suitable form.

As shown in FIG. 2, the light-sensitive receiver 4 consists of a light-sensitive circuit 5, a rectifying circuit 6, and a threshold circuit 7. The light-sensitive receiver proper consists of a phototransistor 9, which is connected in series with a resistor 10. This series connection is shunted across a source of voltage 11. The collector of the phototransistor 9 is connected to a capacitor 12, the other plate of which is connected by a resistor 13 to the emitter of the phototransistor 9. This plate of the capacitor 12 is also connected to a diode 14, the cathode of which is connected to a resistor 15 and a capacitor 16 that are connected in series. The diode 14, the resistor 15, and the capacitor 16 are connected across the resistor 13. The terminal between the resistor 13 and the capacitor 16 is connected to the input of a standard threshold switch (TAA 560) 17. A solenoid 18, which operates a switch, is connected to the output of the threshold switch 17.

The circuit just described operates in the following manner. So long as the leader, with its uniform light transmissivity, moves past the phototransistor 9, light of constant intensity falls upon the transistor. Consequently, the voltage on the collector of the transistor is constant, and this voltage, because of the capacitor 12, is not conducted to the diode 14. The input of the threshold switch 17 receives no voltage, and the magnet 18 is not energized.

The movable contact arm 19, the position of which is controlled by the solenoid 18, continues to touch the contact 19a. The film advance, not shown, remains switched to high threading speed.

When the leader has passed by and the exposed portion of the film, with its non-uniform light transmissivity, passes by the phototransistor 9, a light beam of varying intensity falls upon the latter. A voltage of constantly changing value appears across the light sensitive circuit 5. This varying voltage is amplified by the transistor 9 and rectified by the rectifier 6. The resulting rectified voltage is sufficient to operate the threshold switch 17, causing the solenoid 18 to be energized, so that the contact arm 19 is moved to the contact 19b. The film advance is now switched to projection speed.

In accordance with the invention, the solenoid 18 can also be used to control directly a mechanical member for changing the speed of the film advance or to control directly some drive arrangement for changing the speed of the film advance. When the exposed portion of the film has passed by, the trailer, with its uniform light transmissivity, passes by the transistor 9. Consequently, there is incident upon the phototransistor a light beam of constant intensity, so that there appears in the circuit 5 a voltage of constant value. The solenoid 18 is de-energized, and the arm 19 returns to the contact 19a, thereby switching the film advance to threading speed until the trailer has been wound up onto the take-up reel. The resistance value of the resistor 15 determines the time it takes for the capacitor 16 to charge. The value of this resistor causes a certain delay before the threshold switch 17 is operated, so that small inhomogeneities, such as pin holes and the like, in the leader do not cause an undesired operation of the threshold switch. The resistor 13 is the load resistor for the rectifier circuit 6.

In accordance with the embodiment shown in FIG. 3, the light sensitive circuit 5' has a photo diode 20 instead of a phototransistor 9. The threshold switch 7' is a thyristor 21. When a varying voltage appears in the circuit 5' and a corresponding direct current voltage is conducted to the control electrode of the thyristor, the latter is turned on, thereby energizing the solenoid 18 and causing the previously described switching. Shunted across the anode and cathode of the thyristor is a switch 22, which is operated by the rear end of the film and momentarily closed. In this way, the thyristor 21 is shut off, and the magnet 18 is de-energized.

In the embodiment shown in FIG. 4, the light sensitive circuit 5" has a photo resistor 23 as the light sensitive element.

As the figures show, the different embodiments of the light sensitive circuit and of the threshold circuit can be interchanged.

In a still further embodiment of the invention, not shown, imaging optics can be positioned between the light sensitive element and the film. The optics, for example, can be a lens that images a width equal to the width of a frame and a height less than the height of a frame. Further in accordance with the invention, the imaging optics can be a polygonal mirror driven by the film. Once the opaque leader has passed by, and the exposed portion of the film is moving past the light sensitive element, the polygonal mirror changes the frequency at which the light intensity varies and thereby changes the frequency of the varying voltage. The frequency of the latter, with this arrangement, can be so controlled that it is possible to filter out the undesired frequencies.

The invention ensures that the switching is not only independent of the length of the leader and/or trailer, but that it is also independent of any coloring or of any degree of transmissivity, ranging from complete opacity to complete transparency, of the leader and/or the trailer. The required optical difference between the leader and/or trailer, on the one hand, and the exposed part of the film, on the other, is always present.

It will be understood that each of the elements described above, or two or more together, may also find a useful application in other types of circuits differing from the types described above.

While the invention has been illustrated and described as embodied in an automatic switching arrangement for motion picture film projectors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a motion picture film projector having a first and second operative state for projecting motion picture film having at least one unexposed film portion of uniform light transmissivity and an exposed film portion of variable light transmissivity, in combination, first means responsive to said variable light transmissivity for furnishing a first signal indicative of said exposed film portion during projection of said film; and switch means connected to said first means for switching said motion picture film projector from said first to said second operative state in response to said first signal, thereby changing said motion picture film projector from said first to said second operative state at the start of said exposed film portion.

2. A motion picture film projector as defined in claim 1, wherein said motion picture film projector runs at higher than normal projection speed when in said first state, and at normal projection speed when in said second state.

3. A motion picture film projector as defined in claim 1, wherein said first means comprise light source means positioned on one side of the film, for transmitting light along a light path through said film; photosensitive means positioned on the other side of said film for receiving said light transmitted through said film and furnishing an electrical signal corresponding to the intensity thereof, whereby said electrical signal is a constant signal when said light is transmitted through said unexposed film portion and a variable signal when said light is transmitted through said exposed film portion, said variable signal constituting said first signal.

4. A motion picture film projector as defined in claim 3, wherein said variable signal is a voltage of varying amplitude.

5. The motion picture film projector as defined in claim 3 wherein said light source means is the projection lamp of the projector.

6. The motion picture film projector as defined in claim 3 wherein said photosensitive means is a phototransistor.

7. The motion picture film projector as defined in claim 3, wherein said photosensitive means is a photodiode.

8. The motion picture film projector as defined in claim 3, wherein said photosensitive means is a photoresistor.

9. The motion picture film projector as defined in claim 3 including optics for imaging on said photosensitive means an image that encompasses the full width of a frame and less than the full height of a frame.

10. A motion picture film projector as defined in claim 3, further comprising blocking means connected to said photosensitive means for blocking said constant signal, and furnishing said first signal only at a blocking output, and rectifying means connected to said blocking output for furnishing a rectified first signal in response to said first signal; and wherein said switch means comprise threshold switch means connected to the output of said rectifying means for furnishing a threshold output signal when said rectified first signal has an amplitude exceeding a predetermined amplitude.

11. A motion picture film projector as defined in claim 10, wherein said blocking means comprise a capacitor.

12. A motion picture film projector as defined in claim 10, further comprising a magnetically operated switch having a first and second state and connected to the output of said threshold means to switch from said first to said second state in response to said threshold output signal.

13. A motion picture film projector as defined in claim 12, wherein said threshold switch means comprise a thyristor.

14. A motion film projector as defined in claim 13, further comprising a switch connected in shunt across the anode and cathode of said thyristor for resetting said thyristor following said exposed film portion.

References Cited

UNITED STATES PATENTS

| | | | |
|---|---|---|---|
| 2,905,048 | 9/1959 | Miller | 352—92 X |
| 3,432,228 | 3/1969 | Hellmund | 352—92 X |
| 1,944,024 | 1/1934 | Foster | 352—92 |

SAMUEL S. MATTHEWS, Primary Examiner

M. H. HAYES, Assistant Examiner

U.S. Cl. X.R.

352—180